(12) United States Patent
Huseynov et al.

(10) Patent No.: US 9,459,142 B1
(45) Date of Patent: Oct. 4, 2016

(54) FLAME DETECTORS AND TESTING METHODS

(71) Applicant: General Monitors, Inc., Lake Forest, CA (US)

(72) Inventors: Javid J. Huseynov, Fountain Valley, CA (US); Shankar B. Baliga, Irvine, CA (US)

(73) Assignee: General Monitors, Inc., Lake Forest, CA (US)

( * ) Notice: Subject to any disclaimer, the term of this patent is extended or adjusted under 35 U.S.C. 154(b) by 0 days.

(21) Appl. No.: 14/850,672

(22) Filed: Sep. 10, 2015

(51) Int. Cl.
*G01J 1/44* (2006.01)
*G01J 1/16* (2006.01)
*G01J 1/42* (2006.01)
*G08B 17/103* (2006.01)

(52) U.S. Cl.
CPC ............... *G01J 1/44* (2013.01); *G01J 1/1626* (2013.01); *G01J 1/429* (2013.01); *G08B 17/103* (2013.01)

(58) Field of Classification Search
CPC .......... G01J 1/1626; G01J 1/429; G01J 1/44; G08B 17/103
See application file for complete search history.

(56) References Cited

U.S. PATENT DOCUMENTS

| | | | | |
|---|---|---|---|---|
| 5,625,342 | A * | 4/1997 | Hall | F23N 5/082 250/339.05 |
| 5,914,489 | A | 6/1999 | Baliga et al. | |
| 5,936,250 | A | 8/1999 | Baliga et al. | |
| 6,150,659 | A | 11/2000 | Baliga et al. | |
| 7,202,794 | B2 | 4/2007 | Huseynov et al. | |
| 7,687,776 | B2 | 3/2010 | Baliga et al. | |
| 7,710,256 | B2 * | 5/2010 | Tawil | G08B 29/145 340/3.1 |
| 8,792,658 | B2 | 7/2014 | Baliga et al. | |
| 8,797,830 | B2 | 8/2014 | Baliga et al. | |
| 8,955,383 | B2 | 2/2015 | Huseynov et al. | |
| 9,091,613 | B2 | 7/2015 | Baliga | |
| 2012/0050030 | A1* | 3/2012 | Murphy | G08B 29/145 340/514 |
| 2015/0204725 | A1 | 7/2015 | Huseynov et al. | |
| 2015/0276540 | A1 | 10/2015 | Huseynov et al. | |
| 2015/0302727 | A1* | 10/2015 | Piccolo, III | G08B 17/107 340/514 |
| 2015/0310732 | A1* | 10/2015 | Piccolo, III | G08B 29/145 340/515 |

* cited by examiner

*Primary Examiner* — Mark R Gaworecki
(74) *Attorney, Agent, or Firm* — Larry K. Roberts

(57) ABSTRACT

Exemplary embodiments of a flame detector and operating method. Optical energy is received at one or more optical sensors, and the detector processes the energy to determine whether the received energy is from a known remote test source. If so, the flame detector is operated in a test mode. If the processing indicates that the received optical energy is not a test signal, the flame detector is operated in a flame detection operating mode. The detector processing uses an artificial neural network in an exemplary embodiment in the flame detection operation mode.

20 Claims, 8 Drawing Sheets

FLAME DETECTORS AND TESTING METHODS

BACKGROUND

Optical flame detectors are designed to distinguish optical energy emitted by flames from those emitted by other sources. The optical energy may be in ultraviolet through infrared wavelengths depending on the flame detector type. Verifying the ability of flame detectors to detect optical radiation is necessary, in order to establish and verify the response of the safety system to radiation in the same wavelengths and modulation frequencies as those produced by real flames. Conducting such verification in an industrial setting can be challenging due to the likely disruption of safety functions and consequent operational cost. Therefore, it is often desired in field installations that a remote optical test source be auto-detected and able to test the flame detection system without the need to bypass alarms. The need for such remote testing methods is well established, especially as flame detectors are often mounted in areas of restricted access and elevation pointing down, and auto-detection must occur over distances of tens of meters. Such proof testing is a requirement of safety instrumented systems to demonstrate that everything is working and performing as expected.

SUMMARY

An exemplary embodiment of a method of operating an optical flame detector includes receiving optical energy at one or more optical sensors of the flame detector, processing the received optical energy to determine if measured characteristics of the optical energy correspond to predetermined characteristics of a test signal from an optical test source, operating the flame detector in a test mode if the processing indicates the received optical energy is a test signal from the optical test source; if the processing indicates that the received optical energy is not a test signal from the optical test source, operating the flame detector in an operating mode, wherein the flame detector is responsive to optical radiation generated by flames to initiate an alarm mode.

An exemplary embodiment of an optical flame detector is configured to discriminate the optical energy emitted by a flame from energy emitted by man-made optical sources, and includes an optical sensor system responsive to received optical energy to generate electronic signals; a processor system configured to process digitized versions of the electronic signals, and in an operating mode, to process the digitized versions to detect optical radiation and initiate an alarm mode upon flame detection. The processor system is further configured to identify unique optical test signals from a known remote optical test source and to initiate a test mode in response to the identification instead of entering an alarm mode. The processor system is configured to provide an output function to generate flame detector outputs in dependence on the test mode initiation.

BRIEF DESCRIPTION OF THE DRAWINGS

Features and advantages of the disclosure will readily be appreciated by persons skilled in the art from the following detailed description when read in conjunction with the drawings wherein.

DETAILED DESCRIPTION

Figure 1:
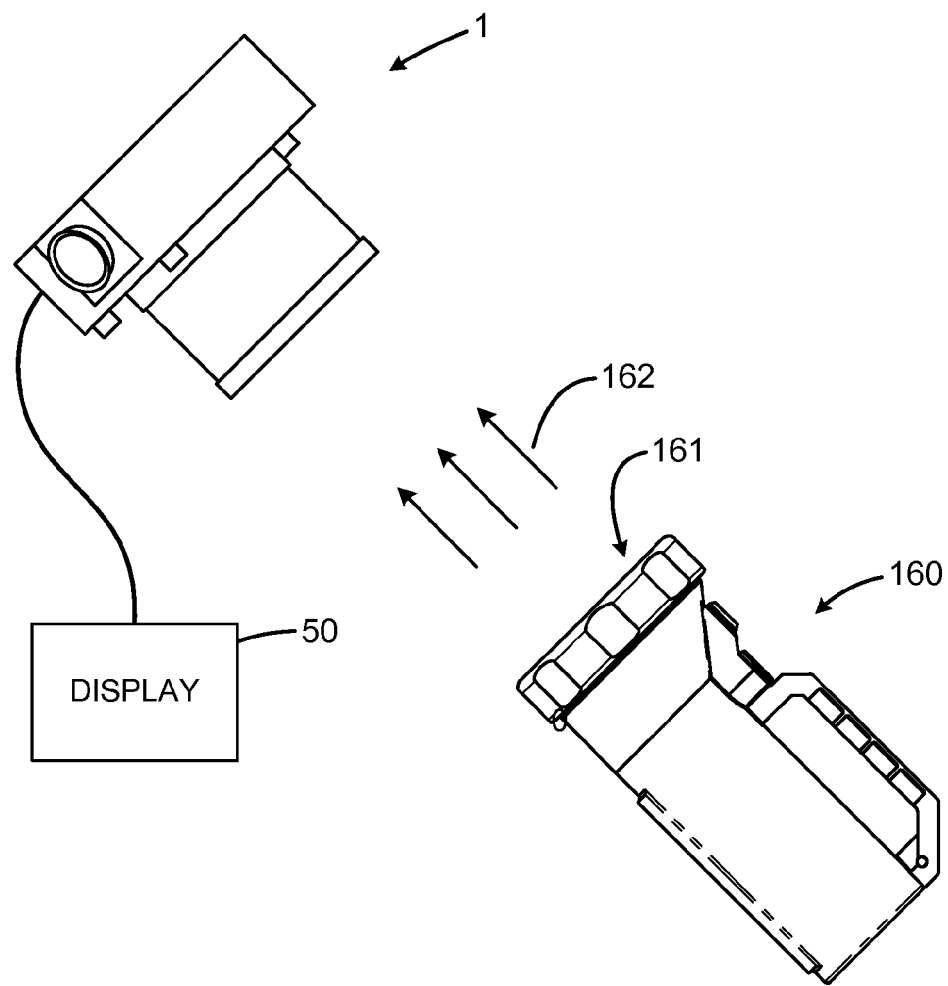
FIG. 1 illustrates an exemplary setup of an infrared flame detector irradiated with infrared radiation from a remote infrared test source along the axis of the detector.

In the following detailed description and in the several figures of the drawing, like elements are identified with like reference numerals. The figures are not to scale, and relative feature sizes may be exaggerated for illustrative purposes.

FIG. 1 illustrates an optical flame detector 1 for use in hazardous locations irradiated with optical energy from a remote optical test source 160 along the axis of the flame detector. As used herein, "irradiate" means to purposefully subject the flame detector to optical radiation. The multi-spectral infrared flame detector 1 in this example comprises a set of four infrared sensors 2A, 2B, 2C, 2D (FIG. 2), and is typically mounted high up surveying the industrial facility facing downward. In an exemplary installation, the mounting height may be on the order of 10 meters to 20 meters above the ground or floor. The flame detector 1 responds to the optical energy 162 emitted through the optical window 161 of the optical test source 160 with an output generated by each of the four sensor elements (2A, 2B, 2C, and 2D). In a functional test, the operator would typically walk around and remote test the flame detector 1 from different directions.

Figure 3:
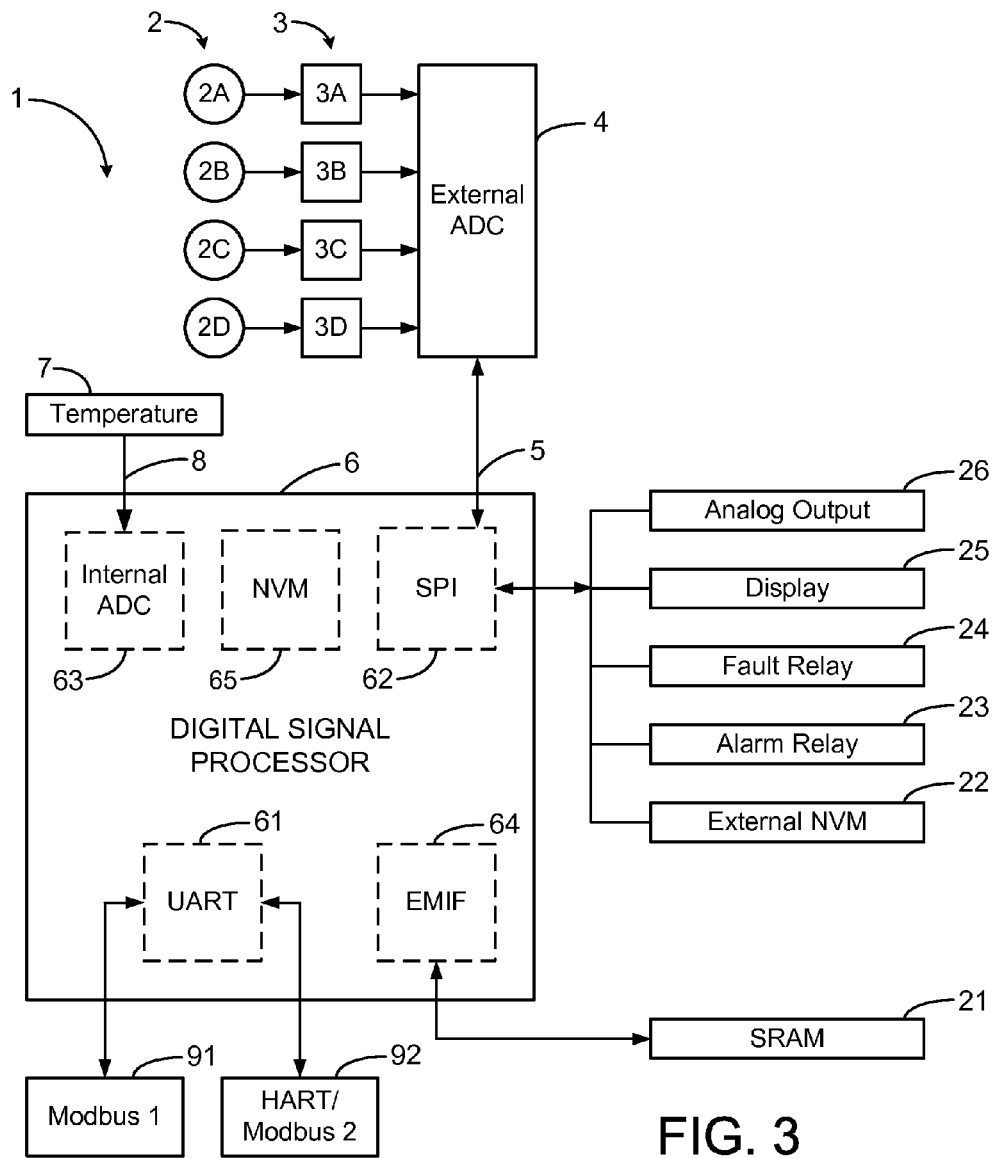
FIG. 3 is a schematic block diagram of an exemplary embodiment of a multi-spectral infrared flame detector.

FIG. 3 illustrates a schematic block diagram of an exemplary embodiment of a multiple sensor flame detection system 1 comprising four optical sensors 2A, 2B, 2C, 2D with analog outputs. In this exemplary embodiment, the optical sensors include sensors for sensing energy in the infrared spectrum. In an exemplary embodiment, the analog signals generated by the sensors are conditioned by electronics 3A, 3B, 3C, 3D and then converted into digital signals by the analog to digital converter (ADC) 4.

In the exemplary embodiment of FIG. 3, the multi-spectral flame detection system 1 includes an electronic controller or signal processor 6, e.g., a digital signal processor (DSP), an ASIC or a microcomputer or microprocessor based system. In an exemplary embodiment, the controller 6 may comprise a DSP, although other devices or logic circuits may alternatively be deployed for other applications and embodiments. In an exemplary embodiment, the signal processor 6 also includes a dual universal asynchronous receiver transmitter (UART) 61 as a serial communication interface (SCI), a serial peripheral interface (SPI) 62, an internal ADC 63 that may be used to monitor a temperature sensor 7, an external memory interface (EMIF) 64 for an external memory (SRAM) 21, and a non-volatile memory (NVM) 65 for on-chip data storage. Modbus 91 or HART 92 protocols may serve as interfaces for serial communication over UART 61. Both protocols are well-known in process industries, along with others such as PROFIbus, Fieldbus and CANbus, for interfacing field instrumentation to a computer or a programmable logic controller (PLC).

In an exemplary embodiment, signal processor 6 receives the digitized sensor signals 5 from the ADC 4 through the SPI 62. In an exemplary embodiment, the signal processor 6 is connected to a plurality of other interfaces through the SPI 62. These interfaces may include an external NVM 22, an alarm relay 23, a fault relay 24, a display 25, and an analog output 26.

In an exemplary embodiment, the analog output 26 may be a 0-20 mA output. In an exemplary embodiment, a first current level at the analog output 26, for example 16 mA, may be indicative of a flame warning condition, a second current level at the analog output 26, for example 20 mA, may be indicative of a flame alarm condition, a third current level, for example 4 mA, may be indicative of normal operation, e.g., when no flame is present, and a fourth current level at the analog output 26, for example 0 mA, may be indicative of a system fault, which could be caused by conditions such as electrical malfunction. In other embodiments, other current levels may be selected to represent various conditions. The analog output 26 can be used to trigger a fire suppression unit, in an exemplary embodiment.

In an exemplary embodiment, the plurality of sensors 2 comprises a plurality of spectral sensors, which may have different spectral ranges and which may be arranged in an array. In an exemplary embodiment, the plurality of sensors 2 comprises optical sensors sensitive to multiple wavelengths. At least one or more of sensors 2 may be capable of detecting optical radiation in spectral regions where flames emit strong optical radiation. For example, the sensors may detect radiation in the UV to IR spectral ranges. Exemplary sensors suitable for use in an exemplary flame detection system 1 include, by way of example only, silicon, silicon carbide, gallium phosphate, gallium nitride, and aluminum gallium nitride sensors, and photoelectric tube type sensors. Other exemplary sensors suitable for use in an exemplary flame detection system include IR sensors such as, for example, pyroelectric, lead sulfide (PbS), lead selenide (PbSe), and other quantum or thermal sensors. In an exemplary embodiment, a suitable UV sensor operates in the 200-260 nanometer region. In an exemplary embodiment, the photoelectric tube-type sensors and/or aluminum gallium nitride sensors each provide "solar blindness" or immunity to sunlight. In an exemplary embodiment, a suitable IR sensor operates in the 4.3 micron region specific to hydrocarbon flames, or the 2.9 micron region specific to hydrogen flames.

In an exemplary embodiment, the plurality of sensors 2 comprise, in addition to sensors chosen for their sensitivity to flame emissions (e.g., UV, 2.9 micron and 4.3 micron), one or more sensors sensitive to different wavelengths to help identify and distinguish flame radiation from non-flame radiation. These sensors, known as immunity sensors, are less sensitive to flame emissions; however, they provide additional information on infrared background radiation. The immunity sensor or sensors detect wavelengths not associated with flames, and may be used to aid in discriminating between radiation from flames and non-flame sources. In an exemplary embodiment, an immunity sensor comprises, for example, a 2.2 micron wavelength sensor. A sensor suitable for the purpose is described in U.S. Pat. No. 6,150,659.

Figure 2:
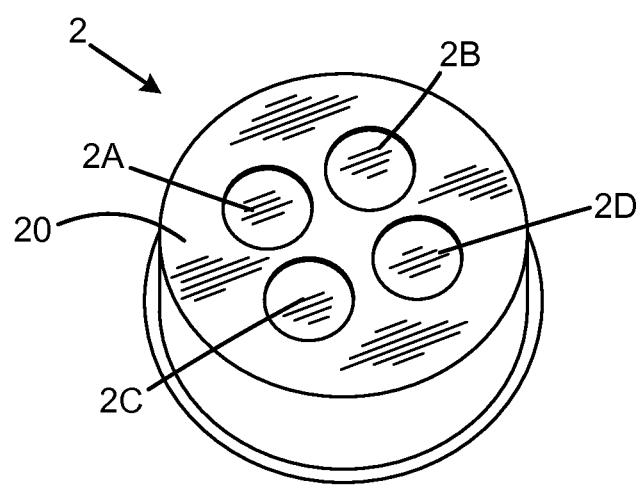
FIG. 2 is an exemplary infrared detector housing comprising four sensor elements sensitive at four different infrared wavelengths for a multi-spectral flame detection system.

In a further exemplary embodiment, the flame detection system 1 includes four sensors 2A-2D, which incorporate spectral filters respectively sensitive to radiation at 2.2 micron (2A), 4.45 micron (2B), 4.3 micron (2C) and 4.9 micron (2D). In an exemplary embodiment, the filters are selected to have narrow operating bandwidths, e.g. on the order of 100 nanometers, so that the sensors are only responsive to radiation in the respective operating bandwidths, and block radiation outside of their operating bands. In an exemplary embodiment, the optical sensors 2 are packaged closely together as a cluster or combined within a single sensor package. This configuration leads to a smaller, less expensive sensor housing structure, and also provides for a more unified optical field of view of the instrument. An exemplary sensor housing structure suitable for the purpose is the housing for the infrared detector LIM314, marketed by InfraTec GmbH, Dresden, Germany. FIG. 2 illustrates an exemplary sensor housing structure 20 suitable for use in housing the sensors 2A-2D in an integrated unit.

U.S. Pat. No. 7,202,794 B2, issued Apr. 10, 2007 describes how a multi-spectral flame detector uses an artificial neural network to discriminate between infrared radiation from a real flame, from an infrared test source and from background nuisance. The '794 patent, the entire contents of which are herein incorporated by this reference, in column 9, rows 45 to 62 describes how the artificial neural network is trained for four different target outputs labeled quiet, flame, false alarm and test lamp. Such use of the neural network to detect a test lamp places a burden on the neural network in addition to a primary function of discriminating flame radiation from that emitted by nuisance sources such as hot bodies, rotating equipment, and modulated or reflected sunlight.

In accordance with aspects of an embodiment of this invention, the optical test source 160 is modulated on/off at two exemplary frequencies $f_1$ and $f_2$, such as 4 Hz and 6 Hz alternating with 6 cycles of each. In other words, the output of the test source is turned on and off at the rate of the respective frequencies $f_1$ and $f_2$, at an exemplary duty cycle of 50%. These modulation frequencies are selected as they are typical of the random flicker frequencies generated in a flame. Such a unique pattern of emitted infrared radiation is highly unlikely to emanate from any natural source. The test source thus has a unique optical emission signature or fingerprint, while operating in the same frequency range as optical radiation from real flames, enabling a realistic test of the flame detection system via entry into a test mode. A test lamp, such as a model TL105 marketed by General Monitors, Inc. may be modified to automatically turn on/off at these modulation rates. The TL105 test lamp provides a high-energy, broadband radiation source in the UV and infrared spectra to activate UV and/or IR flame detectors.

In another embodiment of the invention, the optical test source may include more than one optical emitter, for example, the optical test source might include a UV source and an IR source. In such embodiment, the UV source could be modulated at 4 Hz while the IR source is modulated at 6 Hz. Such a unique pattern of modulated radiation is not possible from natural sources and could be used for auto-detection with flame detectors that contain UV and IR sensors. The model FL3100H, marketed by General Monitors, Inc. contains a UV sensor and an IR sensor and may alternately be tested with such a dual emitter test source. Other combinations of UV, visible and IR sources modulated with different frequencies and patterns may be used depending on the sensors within the flame detector. The test source may include, for example, a laser as the optical source, e.g. an infrared laser emitting radiation in the wavelength range as one of the detector sensors.

Figure 4A:
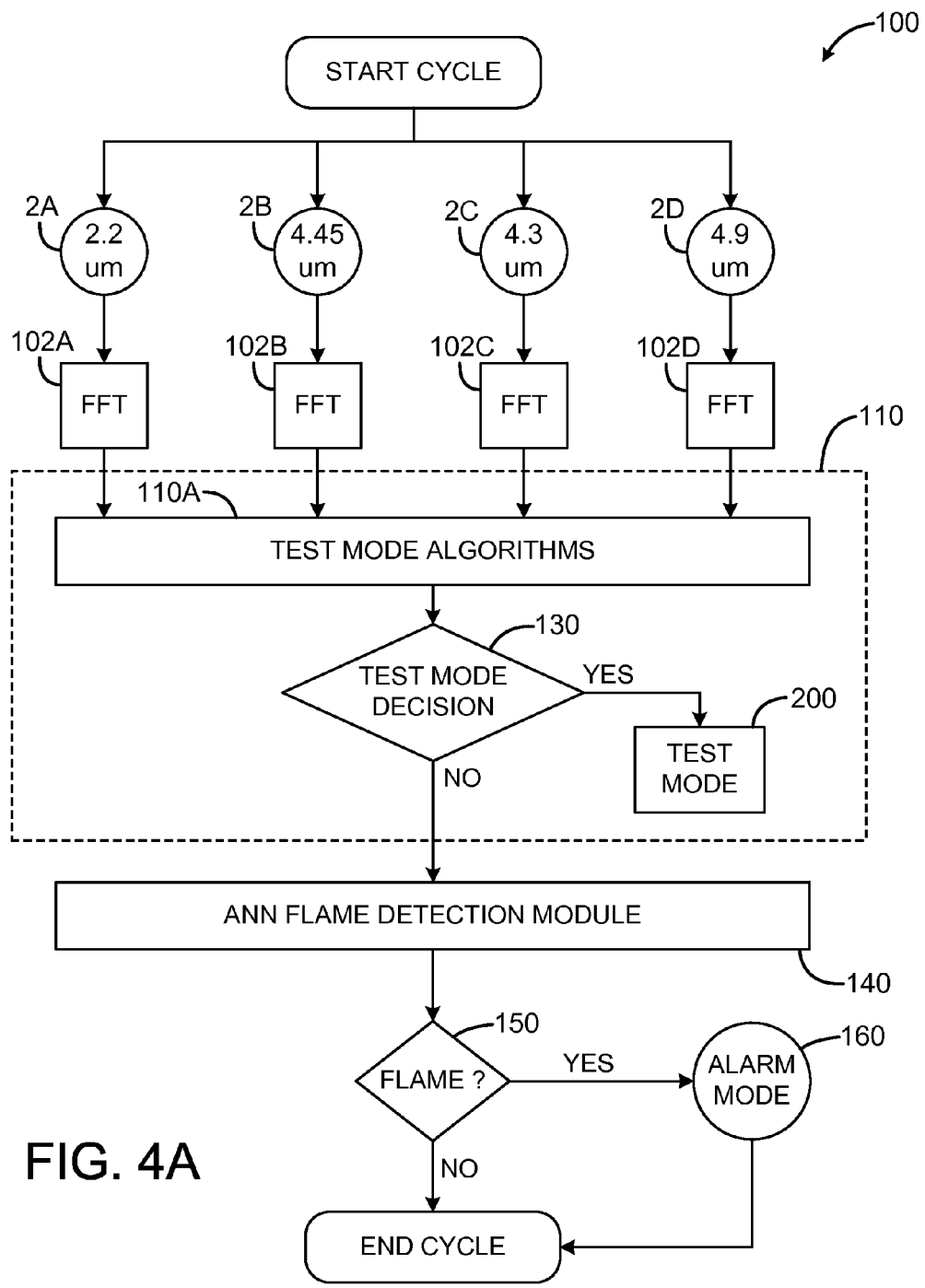
FIG. 4A is an exemplary flow diagram of processing functions utilized in an exemplary embodiment of the multi-spectral flame detector.

FIG. 4A is an exemplary flow diagram of the processing functions implemented by the processor 6 utilized in an exemplary embodiment of a multi-spectral flame detector. The irradiation pattern with the processing scheme illustrated in FIG. 4A frees the artificial neural network 140 from the burden of identifying the optical test source from the myriad of nuisance infrared sources and real flame radiation. The electrical signals from the four sensors 2A, 2B, 2C, 2D after preprocessing (by conditioning electronics 3A, 3B, 3C, 3D and ADC 4) undergo respective fast Fourier transforms (FFT) 102A, 102B, 102C, 102D, following which the transformed signals are analyzed in test mode detection module 110. If the presence of radiation from a test lamp is detected (130) by the module 110, the flame detector 1 enters a test mode 200. One, more, or all of the four sensors may be used to decide on the presence of a test lamp.

If a test lamp is not detected by module 110, the digital signal processor 6 (FIG. 3) provides the frequency domain signals (from FFTs 102A, 102B, 102C, 102D) to an artificial neural network (ANN) module 140 that has been trained on radiation from flames. Details of an exemplary embodiment of the design, training and implementation of a suitable artificial neural network for flame detection are given in U.S. Pat. No. 7,202,794 B2.

In an exemplary embodiment, the processing flow illustrated in FIG. 4A is serial, and in a continuous loop. That is, the cycle illustrated in FIG. 4A is repeated in a loop, i.e. processing the signals with module 110 for detecting the presence of the special modulation utilized for the test lamp, and then, if no test lamp radiation is detected, processing the signals with the flame detection module 140 for detecting the presence of a flame within the surveilled scene. This exemplary embodiment is well suited for implementation in a flame detector system with a single processor. In other embodiments, separate processors may be employed which permit simultaneous processing (110, 140) for the test lamp and for flame.

Figure 4B:
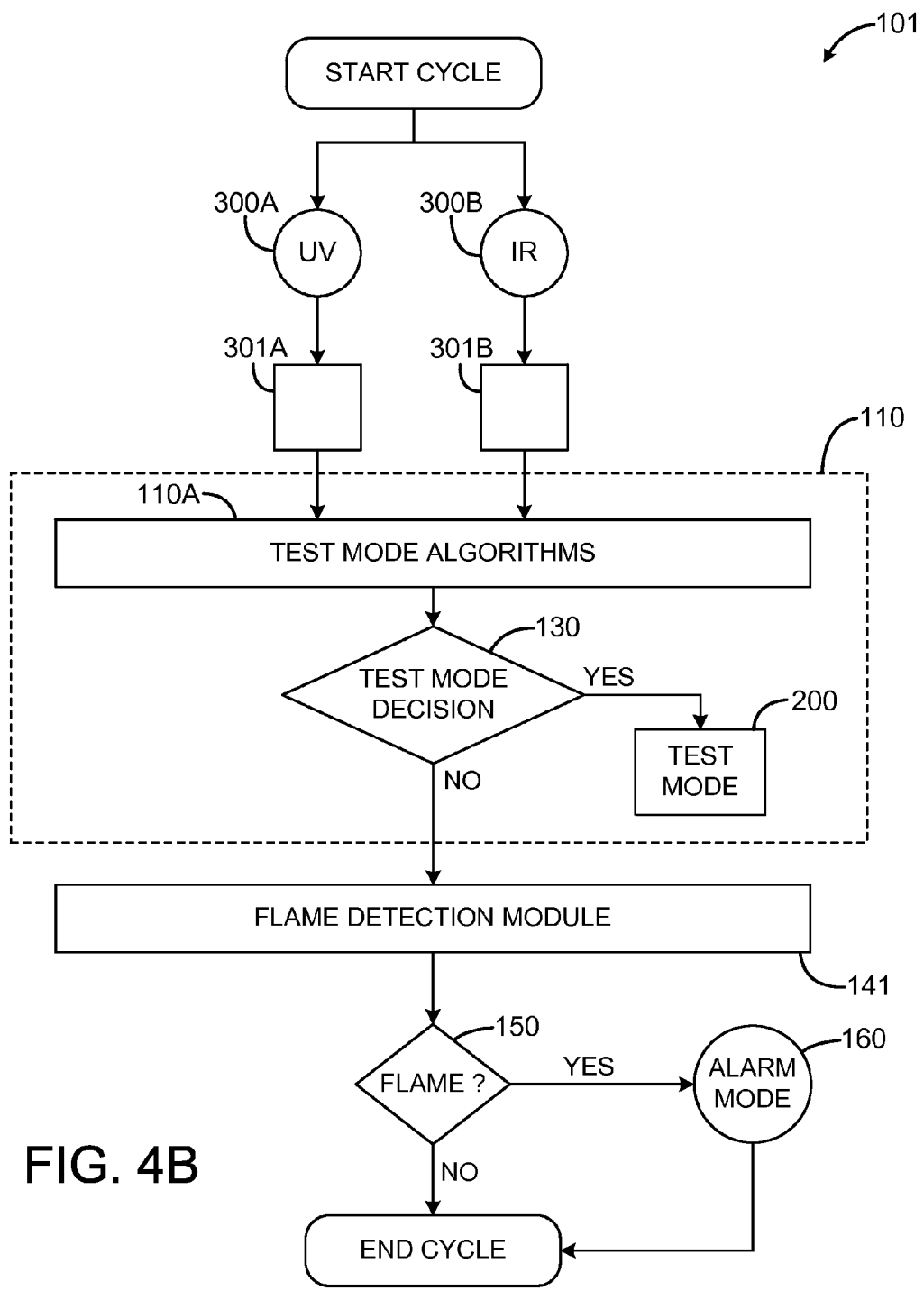
FIG. 4B is an exemplary flow diagram of processing functions utilized in an exemplary embodiment of a UV/IR flame detector.

FIG. 4B is an exemplary flow diagram of the processing functions implemented by the processor utilized in an exemplary embodiment of a UV/IR flame detector 101. Signals from a UV sensor 300A and an IR sensor 300B are signal conditioned and preprocessed at 301A and 302B. Such signal conditioning and preprocessing may include an FFT or the signals may continue in the time domain. In Test Mode Algorithms 110A, a decision is taken as to whether a remote optical test source has been detected. If a test mode is not detected the Flame Detection module 141 decides whether flame radiation has been detected.

Figure 5A:
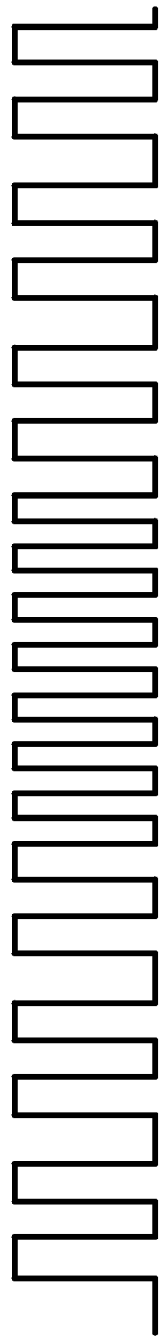
FIG. 5A is an exemplary timing diagram of the two frequency modulation of the infrared test lamp shown in FIG. 1.
Figure 5B:
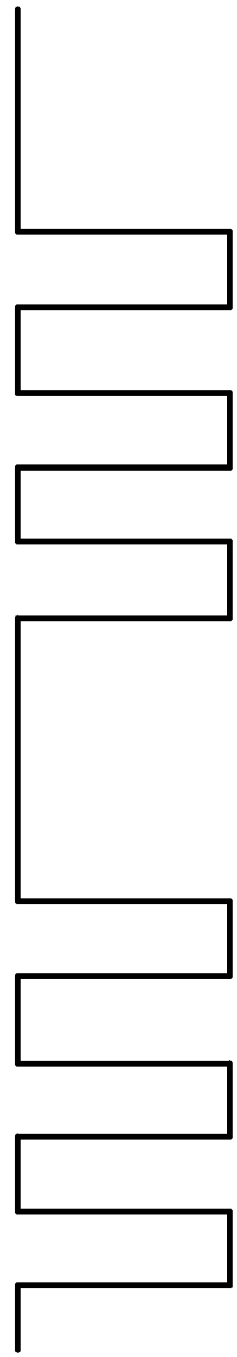
FIG. 5B is an exemplary timing diagram of another modulation scheme that may be used to drive an infrared test lamp.
Figure 6:
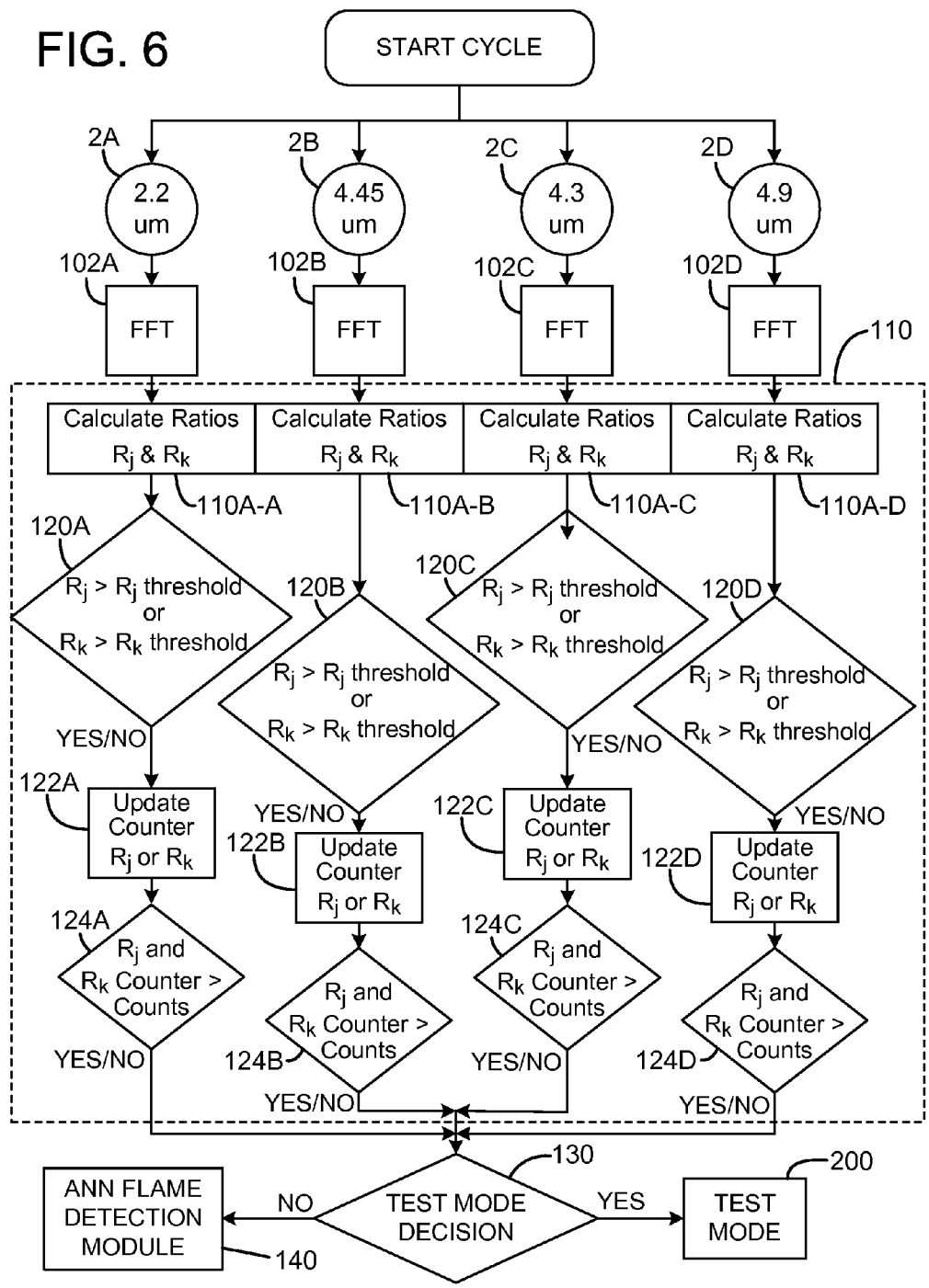
FIG. 6 is an exemplary flow diagram of an exemplary embodiment of a test mode module with expert decision algorithms to auto-detect the presence of modulated radiation from an optical test lamp.

FIG. 5A is an exemplary timing diagram of the dual frequency modulation of the test lamp 160 shown in FIG. 1, with a repeating pattern of six cycles each at 4 Hz and 6 Hz. FIG. 5B is an exemplary timing diagram of another modulation scheme that may be used to drive an optical test lamp, with a repeating cycle of (i) a first interval of two cycles at 3 Hz, duty cycle of 50% followed by (ii) a second interval in which the lamp is continuously on for a time period equal to that of the first interval. Other frequencies and patterns may be used depending on the flame detector type and the optical sensors used in the flame detector. Such modulation patterns can be readily identified in the flame detector via spectral analysis as shown in FIG. 6. The frequency spectrum of the test lamp pattern, with strong peaks at 4 Hz and 6 Hz, stands out against the random, broadband (0.5 Hz to 15 Hz) frequency flicker generated by flame radiation.

To distinguish and quantify the frequency peak content in the received optical energy, an algorithm illustrated in FIG. 6 may be performed by the processor module 110. In an exemplary computation, the magnitude $Y_j$ of spectrum at specific frequency j, i.e., the frequency $f_1$, is evaluated against the sum of magnitudes at all the remaining frequencies except frequency j and frequency k, i.e. the frequencies $f_1$ and $f_2$. The magnitude $Y_k$ is subtracted in the denominator to avoid the situation where the frequency is switching from $f_1$ to $f_2$ which could lead to the denominator growing if $Y_k$ were not subtracted from the summation. Similarly, the magnitude $Y_k$ of spectrum at specific frequency k, i.e., the frequency f2, is evaluated against the sum of magnitudes at all the remaining frequencies except frequency j and frequency k, i.e. the frequency $f_1$ and the frequency $f_2$. This evaluation is expressed using ratios $R_j$ and $R_k$ described below:

$$R_j = \frac{Y_j}{\sum_{i=0}^{max(k)} Y_i - (Y_j + Y_k)} \quad (1)$$

$$R_k = \frac{Y_k}{\sum_{i=0}^{max(k)} Y_i - (Y_j + Y_k)} \quad (2)$$

If during the period of six computation cycles, the ratios $R_j$ and $R_k$ consistently exceed a certain predefined threshold, the flame detector will enter a test mode. One, more, or all of the four sensors may be used to decide on the presence of a test lamp. The computation and comparison are carried out for each of the sensors independently. Requiring that all sensors have detected the test signal will improve the robustness of detection accuracy of the test signal, but will usually reduce the distance between the test source and the sensor required to detect the test lamp. A test lamp or source may produce increased amplitude at a given frequency corresponding to one sensor relative to its amplitude at another sensor frequency. The determination of whether to employ one sensor for the test source detection, more than one, or all sensors in the test source detection module, may depend on the particular implementation or application.

The described method of ratio calculation can be used to reject background nuisance from the infrared sources that emit radiation in other single-peak or broadband frequency bands. Due to the specific temporal pattern of two alternating frequencies produced by the test lamp, the flame detector is able to distinguish the lamp from other sources.

In this exemplary embodiment, both ratios $R_j$ and $R_k$ must exceed independently established thresholds for each of the sensor wavelengths, in order for the flame detector to enter test mode. It is therefore unlikely that test mode initiation could happen accidentally. It would also be very difficult for mischief makers or saboteurs to intentionally set a flame detector into the test mode unless they were in possession of an authentic remote test source pointed towards a flame detector configured to detect it.

Referring again to FIG. 6, an exemplary embodiment of the test mode module 110 is illustrated in further detail. In an exemplary embodiment, the peak of the FFT spectrum is calculated every 250 milliseconds (over the past 250 milliseconds), for each of the four sensors 2A, 2B, 2C, 2D comprising the infrared detector at 110A-A, 110A-B, 110A-C and 110A-D. If the peak is at 4 Hz, the ratio $R_j$ is compared against a preset 4 Hz peak threshold (120A, 120B, 120C, 120D). The larger the preset $R_j$ threshold, the closer will the test lamp have to be to the flame detector. Similarly, if the peak is at 6 Hz, the ratio $R_k$ is compared against a preset 6 Hz peak threshold. If the peak ratio at 4 Hz or 6 Hz is greater than its threshold (120A, 120B, 120C, 120D) for the respective sensor channels, a counter is updated at 122A, 122B, 122C, 122D, one each for 4 Hz (j) and 6 Hz (k). In this exemplary embodiment, every 1500 milliseconds, there must be at least 3 peaks of 4 Hz and 3 peaks of 6 Hz, to declare that the radiation is from the test lamp. In this embodiment, the system is not looking for 6 cycles each of 4 Hz and 6 Hz which would take 2500 milliseconds. If the counter for both $R_j$ and $R_k$ exceeds a predetermined count limit, e.g. 3, at 124A, 124B, 124C, 124D, for any of the sensor channels in this embodiment, a decision is taken in the test mode decision block 130 as to whether to enter the test mode 200. As noted above, one, more, or all of the four sensing element channels may be used to decide on the presence of a test lamp. Otherwise, processor operation proceeds to the ANN flame detection module 140 for processing for flame.

Figure 7:
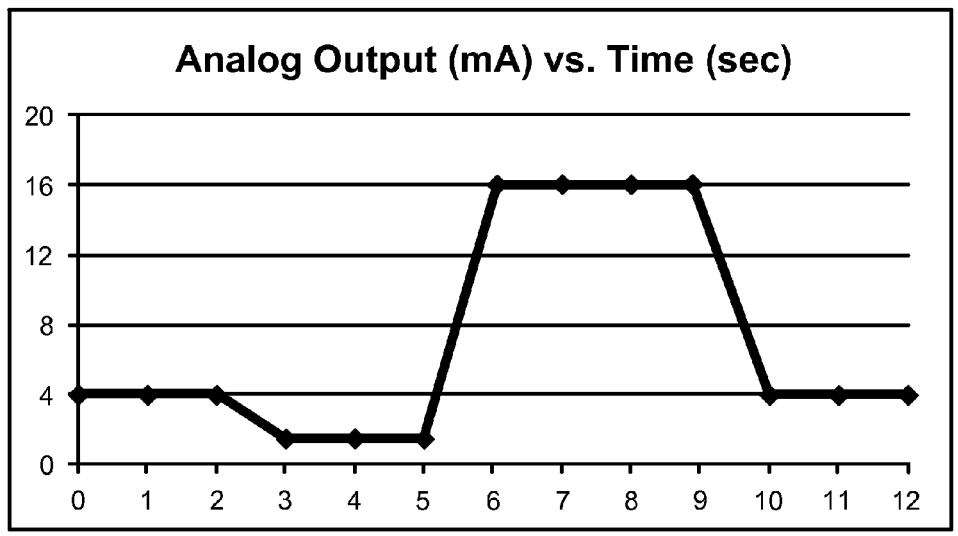
FIG. 7 is an exemplary timing diagram of the analog output entering and exiting test mode in an exemplary embodiment of a multi-spectral flame detector system.
Figure 8A:
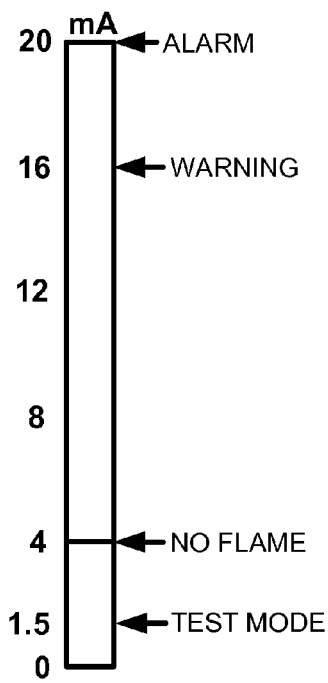
FIG. 8A is an exemplary diagram of the analog output of an exemplary embodiment of a multi-spectral flame detector with a test mode at 1.5 mA.
Figure 8B:
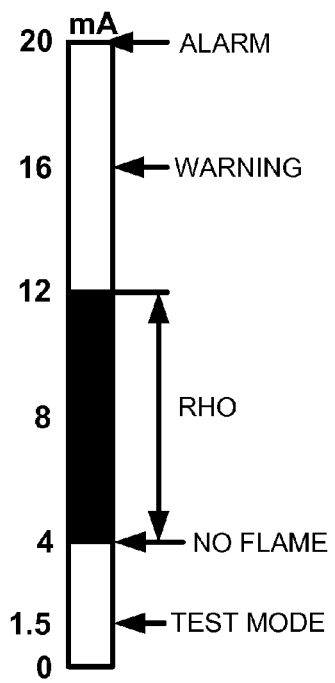
FIG. 8B is an exemplary diagram of the analog output of an exemplary embodiment of a multi-spectral flame detector with a test mode at 1.5 mA analog with the Radiant Heat Output (RHO) value outputted between 4 mA and 12 mA.

Once the flame detector 1 determines at 130 (FIG. 4A) that the received energy emanates from a remote test source (i.e. a friendly source), it can immediately initialize a test mode 200 whereby the flame detector indicates to the outside world the presence of a test source rather than a flame. In an exemplary embodiment, illustrated in FIGS. 7, 8A and 8B, this indication can take the form of the analog output 26 (FIG. 3) (0 to 20 mA) of the flame detector being set to 1.5 mA for 2 seconds, commencing at the 3 second marker and ending at the 5 second marker in FIG. 7, signaling to the user that it has entered a test mode. Analog output current levels (FIGS. 8A and 8B) between 0 and 4 mA are used to indicate states such as test mode or faults, with 4 mA indicating no flame. In an exemplary embodiment, the user system in which the flame detector 1 is installed automatically disables the alarm system for a period of time, or until the remote infrared test source is switched off or pointed away from the flame detector. The automatic disablement typically happens in the user's control system. The control system monitors the flame detector output, and when the output goes to 1.5 mA, the control system conducts a preprogrammed action, such as monitor Warning and Alarm output levels, but without taking any executive action such as dumping Halon or activating other fire suppression systems. When the test lamp is switched off or pointed away from the flame detector, at the 9 second marker in the example shown in FIG. 7, the flame detector automatically resumes normal operational processing, with analog output at 4 mA.

While the infrared flame detector is in test mode 200, the energy received by the sensors 2A-2D may be compared against what is to be expected from the energy generated by the remote test unit 160 at that distance. U.S. Publication 2015/0204725 A1, the entire contents of which are incorporated herein by this reference, describes how the energy received by the sensors that comprise a flame detector may be used to compute a Radiant Heat Output (RHO) value. In an exemplary embodiment, an analog output of 4 mA represents zero received radiation while the value of 12 mA (FIG. 8B) represents the maximum possible radiation using a logarithmic scale to account for or accommodate a large dynamic range in the received optical energy. If the measured RHO value does not match the expected RHO, for example, the test person would know the flame detector is not functioning properly. A reduced RHO reading may, for example, indicate blockage by dirt or moisture of the flame detector window, leading to maintenance and retest. The measurement of RHO may be indicated on a local display 50 connected to and mounted beneath the flame detector 1, e.g. at floor level, so the test person with the test lamp 160 could view the RHO in a numerical or graphical form during test without the need to monitor the analog output 26. In the alternate embodiment of FIG. 8B, the flame detector does not output analog levels of 16 mA and 20 mA after entering the test mode, but displays a RHO value that the user monitors and logs.

Flame detectors and optical test sources with features as described above provide maintenance personnel with a means to functionally remote test the flame detector at proof test intervals without the disruption caused by the need to manually disable the alarm system.

Although the foregoing has been a description and illustration of specific embodiments of the subject matter, various modifications and changes thereto can be made by persons skilled in the art without departing from the scope and spirit of the invention.

The invention claimed is:

1. A method of testing an optical flame detector, comprising:
   (i) irradiating the flame detector with optical energy from a remote test source which is different from optical energy emitted by a real flame;
   (ii) processing by a first processing module the received optical energy to determine if measured characteristics of the optical energy correspond to predetermined characteristics of a predetermined test signal from an optical test source;
   (iii) operating the flame detector in a test mode if the processing indicates the received optical energy is a test signal from the optical test source;
   (iv) if the processing indicates that the received optical energy is not a test signal from the optical test source, operating the flame detector in an operating mode, wherein a second processing module of the flame detector is responsive to optical radiation generated by flames to initiate an alarm mode; and
   (v) repeating steps (ii), (iii) and (iv) if the processing indicates that the received optical energy is not a test signal.

2. The method of claim 1, wherein said second processing module includes an artificial neural network (ANN) that has been trained on radiation from flames.

3. The method of claim 1, wherein the step of irradiating the flame detector with optical energy from a remote test source includes:
   modulating optical energy radiated by the optical test source by a repeating pattern at a first frequency $f_1$ and at a second frequency $f_2$, the first frequency $f_1$ and the second frequency $f_2$ typical of frequencies generated in a flame.

4. The method of claim 3, wherein the first frequency $f_1$ is 4 Hz and the second frequency $f_2$ is 6 Hz.

5. A method of operating an optical flame detector, comprising:
   receiving optical energy at a plurality of optical sensors of the flame detector;
   processing the received optical energy to determine if measured characteristics of the optical energy correspond to predetermined characteristics of a test signal from an optical test source;
   operating the flame detector in a test mode if the processing indicates the received optical energy is a test signal from the optical test source;
   if the processing indicates that the received optical energy is not a test signal from the optical test source, operating the flame detector in an operating mode, wherein the flame detector is responsive to optical radiation generated by flames to initiate an alarm mode.

6. The method of claim 5, further comprising:
   radiating optical energy from the optical test source;
   modulating the test source optical energy by a repeating pattern at a first frequency $f_1$ and at a second frequency $f_2$, the first frequency $f_1$ and the second frequency $f_2$ typical of frequencies generated in a flame.

7. The method of claim 6, wherein said first frequency $f_1$ is 4 Hz and said second frequency $f_2$ is 6 Hz.

8. The method of claim 6, wherein the optical energy radiated from the optical test source includes infrared energy.

9. The method of claim 6, wherein the optical energy radiated from the optical test source includes ultraviolet energy.

10. The method of claim 5, wherein the step of operating the flame detector in an operating mode includes processing the received optical energy with an artificial neural network to detect the existence of a flame.

11. The method of claim 5, wherein the plurality of optical sensors includes a first optical sensor sensitive to radiation at an ultraviolet (UV) wavelength, and a second sensor sensitive to an infrared (IR) wavelength.

12. The method of claim 5, wherein the plurality of optical sensors comprises a sensor operating at a wavelength specific to hydrocarbon flames, and a sensor operating at a wavelength specific to hydrogen flames.

13. A flame detector for industrial safety applications in hazardous locations, configured to discriminate the optical energy emitted by a flame from energy emitted by man-made optical sources, comprising:
   at least one optical sensor channel, each channel including an optical sensor configured to receive optical energy from a surveilled scene within a field of view, the at least one optical sensor channel producing signals providing an indication of the optical radiation received by the optical sensor within a sensor spectral bandwidth, the optical sensor configured for detecting optical radiation in a spectral region where flames emit strong optical radiation;
   a processor responsive to the signals from the at least one optical sensor channel and configured to digitally process and analyze the signals, the processor including a test mode module configured to process the signals and to determine if measured characteristics of the optical energy correspond to predetermined characteristics of a test signal from an optical test source, and to put the flame detector into a test mode if a test signal is detected, and a flame detection processing module responsive to the signals from the at least one optical sensor channel if no test signal is detected to provide a flame alarm signal upon detection of a real flame event.

14. The flame detector of claim 13, wherein the flame detection module comprises an artificial neural network.

15. The flame detector of claim 13, wherein the at least one optical sensor channel comprises a plurality of sensor channels, and wherein the optical sensors of the plurality of sensor channels are sensitive to radiation from flames at different spectral regions.

16. The flame detector of claim 15, wherein:
   the test module is configured to put the detector into the test mode if the received optical energy from one or more of the plurality of sensor channels is indicative of the test signal.

17. The flame detector of claim 15, wherein the at least one sensor channel comprises a sensor channel operating at a wavelength specific to hydrocarbon flames, and a sensor channel operating at a wavelength specific to hydrogen flames.

18. The flame detector of claim 15, wherein the plurality of sensor channels include a first sensor channel sensitive to radiation at an ultraviolet (UV) wavelength, and a second sensor channel sensitive to an infrared (IR) wavelength.

19. The flame detector of claim 13, wherein the test mode module is configured to analyze a frequency spectrum of the received optical energy and to detect modulated energy in a repeating pattern at a first frequency $f_1$ and at a second frequency $f_2$, the first frequency $f_1$ and the second frequency $f_2$ typical of frequencies generated in a flame.

20. The flame detector of claim 19, wherein the first frequency $f_1$ is 4 Hz and the second frequency $f_2$ is 6 Hz.

* * * * *